(12) United States Patent
Vilayannur et al.

(10) Patent No.: US 8,819,357 B2
(45) Date of Patent: Aug. 26, 2014

(54) METHOD AND SYSTEM FOR ENSURING CACHE COHERENCE OF METADATA IN CLUSTERED FILE SYSTEMS

(75) Inventors: Murali Vilayannur, San Jose, CA (US); Jinyuan Li, Bellevue, WA (US); Satyam B. Vaghani, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 425 days.

(21) Appl. No.: 13/181,129

(22) Filed: Jul. 12, 2011

(65) Prior Publication Data
US 2013/0019067 A1    Jan. 17, 2013

(51) Int. Cl.
*G06F 12/00* (2006.01)
*G06F 12/08* (2006.01)

(52) U.S. Cl.
CPC .......... *G06F 12/08* (2013.01); *G06F 2212/466* (2013.01); *G06F 12/0866* (2013.01); *G06F 12/0815* (2013.01)
USPC ........... 711/156; 711/130; 711/141; 711/144; 711/145; 711/147; 711/154

(58) Field of Classification Search
CPC . G06F 12/08; G06F 12/0815; G06F 12/0866; G06F 3/0622; G06F 3/0637; G06F 9/5016
USPC .......... 711/130, 141, 144, 145, 147, 154, 156
See application file for complete search history.

(56) References Cited

U.S. PATENT DOCUMENTS

| | | | |
|---|---|---|---|
| 5,734,898 A * | 3/1998 | He | 1/1 |
| 6,914,853 B2 * | 7/2005 | Coulson | 365/236 |
| 7,035,907 B1 * | 4/2006 | Decasper et al. | 709/212 |

* cited by examiner

*Primary Examiner* — Midys Rojas

(57) ABSTRACT

Metadata of a shared file in a clustered file system is changed in a way that ensures cache coherence amongst servers that can simultaneously access the shared file. Before a server changes the metadata of the shared file, it waits until no other server is attempting to access the shared file, and all I/O operations to the shared file are blocked. After writing the metadata changes to the shared file, local caches of the other servers are updated, as needed, and I/O operations to the shared file are unblocked.

19 Claims, 9 Drawing Sheets

METHOD AND SYSTEM FOR ENSURING CACHE COHERENCE OF METADATA IN CLUSTERED FILE SYSTEMS

BACKGROUND

As computer systems scale to enterprise levels, particularly in the context of supporting large-scale data centers, the underlying data storage systems frequently adopt the use of storage area networks (SANs). As is conventionally well appreciated, SANs provide a number of technical capabilities and operational benefits, fundamentally including virtualization of data storage devices, redundancy of physical devices with transparent fault-tolerant fail-over and fail-safe controls, geographically distributed and replicated storage, and centralized oversight and storage configuration management decoupled from client-centric computer systems management.

Architecturally, a SAN storage subsystem is characteristically implemented as a large array of Small Computer System Interface (SCSI) protocol-based storage devices. One or more physical SCSI controllers operate as externally-accessible targets for data storage commands and data transfer operations. The target controllers internally support bus connections to the data storage devices, identified as logical units (LUNs). The storage array is collectively managed internally by a storage system manager to virtualize the physical data storage devices. The virtual storage system manager is thus able to aggregate the physical devices present in the storage array into one or more logical storage containers. Virtualized segments of these containers can then be allocated by the virtual storage system as externally visible and accessible LUNs with uniquely identifiable target identifiers. A SAN storage subsystem thus presents the appearance of simply constituting a set of SCSI targets hosting respective sets of LUNs. While specific storage system manager implementation details differ between different SAN storage device manufacturers, the desired consistent result is that the externally visible SAN targets and LUNs fully implement the expected SCSI semantics necessary to respond to and complete initiated transactions against the managed container.

A SAN storage subsystem is typically accessed by a server computer system implementing a physical host bus adapter (HBA) that connects to the SAN through network connections. Within the server and above the host bus adapter, storage access abstractions are characteristically implemented through a series of software layers, beginning with a low-level SCSI driver layer and ending in an operating system specific file system layer. The driver layer, which enables basic access to the target ports and LUNs, is typically specific to the communication protocol used by the SAN storage subsystem. A data access layer may be implemented above the device driver to support multipath consolidation of the LUNs visible through the host bus adapter and other data access control and management functions. A logical volume manager (LVM), typically implemented between the driver and conventional operating system file system layers, supports volume-oriented virtualization and management of the LUNs that are accessible through the host bus adapter. Multiple LUNs can be gathered and managed together as a volume under the control of the logical volume manager for presentation to and use by the file system layer as a logical device.

In typical implementations, a SAN storage subsystem connects with upper-tiers of client and server computer systems through a communications matrix that is frequently implemented using the Internet Small Computer System Interface (iSCSI) standard. When multiple upper-tiers of client and server computer systems (referred to herein as "nodes") access the SAN storage subsystem, two or more nodes may also access the same system resource within the SAN storage subsystem. In such a scenario, a locking mechanism is needed to synchronize the memory operations of the multiple nodes within the computer system. More specifically, a lock is a mechanism utilized by a node in order to gain access to a system resource and to handle competing requests among multiple nodes in an orderly and efficient manner.

In clustered SAN-based file systems, every node in the file system has symmetric access to the SAN. Thus, each node can access and modify a resource in the file system, such as a file or directory, at any time. In certain clustered SAN-based file systems, upon opening a resource, the node reads into its local cache metadata of the resource and relies on the cached copy of the metadata for operations until it closes the resource. When the resource is simultaneously opened by several nodes in multi-writer or similar modes, where multiple nodes can write to the files, and changes to the metadata of the resource are to be allowed, metadata cache coherence across the nodes must be ensured. In currently available clustered SAN-based file systems, metadata cache coherence is provided using complex networking setups, which adds to the implementation complexity of the file system, correctness issues or performance/scaling bottlenecks. Moreover, it requires an "asymmetric" file system implementation in that some nodes are designated "metadata servers" and shoulder the responsibility of doing all locking and ownership grants to other nodes in the system. These metadata servers may become performance and availability bottlenecks.

SUMMARY

One or more embodiments of the present invention provide a technique for ensuring metadata cache coherence of shared files in a clustered file system. In one embodiment, the technique can be implemented without any network components by using SCSI command extensions and information stored in the storage system.

A method of ensuring metadata cache coherence of a shared file that is simultaneously accessed by multiple hosts, according to an embodiment of the present invention, includes the steps of: comparing a version number that is stored in a data field of the shared file's lock with a locally cached version number; if the version numbers match, incrementing the version number and storing the incremented version number in the data field of the shared file's lock; and after the storing, modifying the metadata of the shared file, incrementing the version number once more, and storing the incremented version number in the data field of the shared file's lock.

A method of ensuring metadata cache coherence of a shared file that is simultaneously accessed by multiple hosts, according to another embodiment of the present invention includes the steps of: storing a first value in a predetermined storage location to indicate that the metadata of the shared file is being modified; determining from a counter value whether or not all other hosts that are accessing the shared file recognize that the metadata of the shared file is being modified; and upon determining that all other hosts that are accessing the shared file recognize that the metadata of the shared file is being modified, modifying the metadata of the shared file and storing a second value in the predetermined storage location to indicate that the metadata of the shared file is no longer being modified.

A method of ensuring metadata cache coherence of shared files, each of which is simultaneously accessed by multiple hosts, according to an embodiment of the present invention, includes the steps of designating a first one of the multiple hosts as a lock manager for a first shared file, and designating a second one of the multiple hosts as a lock manager for a second shared file, wherein each lock manager for a shared file grants a write lock to a modifier host to permit the modifier host to change metadata of the shared file and notifies other hosts that are accessing the shared file of the write lock grant.

Embodiments of the present invention further include a non-transitory computer-readable storage medium storing instructions that when executed by a computer system cause the computer system to perform one or more the methods set forth above, and a computer system having multiple servers that are configured to ensure cache coherence of metadata of a shared file in a clustered file system.

DETAILED DESCRIPTION

Figure 1:
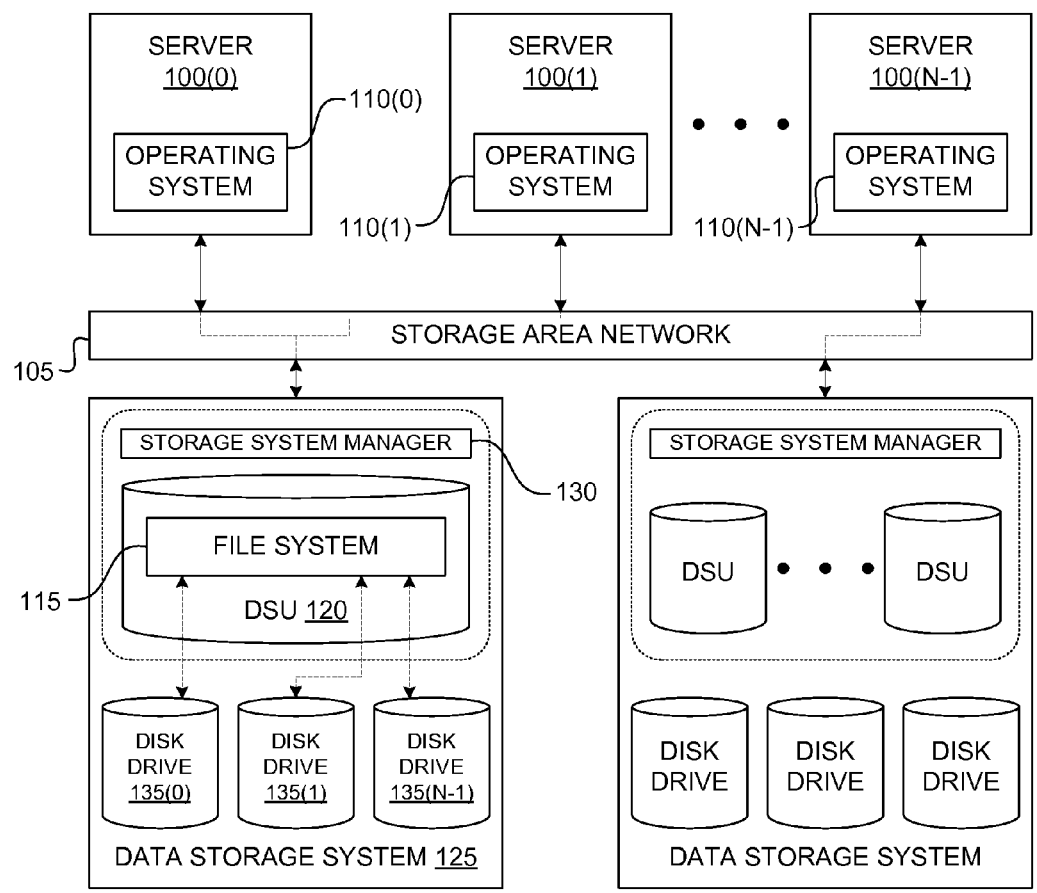
FIG. 1 illustrates a computer system configuration utilizing a shared file system in which one or more embodiments of the present invention may be implemented.

FIG. 1 illustrates a computer system configuration utilizing a shared file system, in accordance with some embodiments. The computer system configuration of FIG. 1 includes multiple servers 100(0) to 100(N−1) (also referred to herein as "hosts"), each of which is connected to a storage area network (SAN) 105. Operating systems 110(0) and 110(1) on servers 100(0) and 100(1) interact with a shared file system 115 that resides on a data storage unit (DSU) 120 accessible through SAN 105. In particular, data storage unit 120 is a logical unit (LUN) of a data storage system 125 (e.g., disk array) connected to SAN 105. While DSU 120 is exposed to operating systems 110(0) and 110(1) by system storage manager 130 (e.g., disk controller) as a contiguous logical storage space, the actual physical data blocks upon which shared file system 115 may be stored is dispersed across the various physical disk drives 135(0) to 135(N−1) of data storage system 125.

Shared file system 115 contains a plurality of files of various types, typically organized into one or more directories. Shared file system 115 further includes metadata data structures that specify information about shared file system 115, such as block bitmaps that indicate which data blocks in shared file system 115 remain available for use, along with other metadata data structures describing directories and files in shared file system 115. For example, each file and directory has associated metadata, known as an inode, that specifies information such as the data blocks that constitute the file or directory and other information such as the date of creation of the file or directory and the size of the file or directory.

Figure 2:
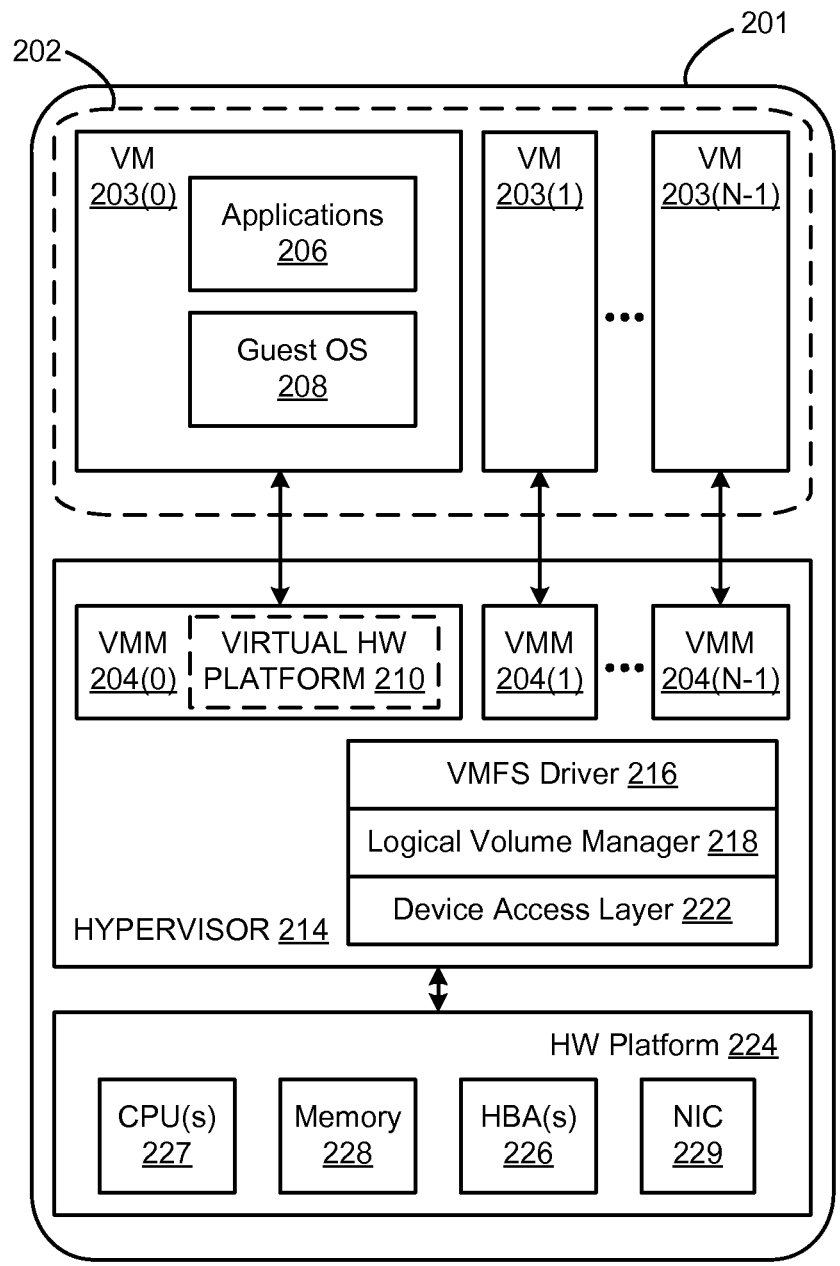
FIG. 2 illustrates a virtual machine based system in which one or more embodiments of the present invention may be implemented.

FIG. 2 illustrates a virtual machine based system, in which one or more embodiments of the present invention may be implemented. A computer system 201, generally corresponding to one of servers 100, is constructed on a conventional, typically server-class hardware platform 224, including host bus adapters (HBAs) 226 in addition to conventional components, such as one or more central processing units (CPUs) 227, memory 228, network interface card (NIC) 229, and other standard peripheral components (not separately shown). Hardware platform 224 is used to execute a virtual machine operating system, e.g., hypervisor 214, supporting a virtual machine execution space 202 within which virtual machines (VMs) 203 are executed. Each virtual machine 203 implements a virtual hardware platform 210 that supports the execution of a guest operating system (OS) 208 and one or more applications 206. Guest OS 208 may be any commodity operating system such as Microsoft Windows, Linux, Solaris, and Netware-based operating systems. In some embodiments of the present invention, hypervisor 214 and virtual machines 203 are implemented using the VMware vSphere® product distributed by VMware, Inc. of Palo Alto, Calif.

Hypervisor 214 includes a plurality of software layers including a kernel that manages hardware resources of hardware platform 224 through various drivers, and virtual machine monitors (VMMs) 204 each emulating hardware resources for a corresponding one of VMs 203. In the example illustrated in FIG. 2, VMM 204(0) emulates hardware resources and provides a virtual hardware platform 210 for VM 203(0). In each instance, a VM's guest operating system includes a native file system layer (not shown), for example, either an NTFS or an ext3 type file system layer, that interfaces with one or more virtual disks included in the VM's virtualized hardware platform. File system layers of hypervisor 214 include a virtual machine file system driver (VMFS driver) 216, a logical volume manager 218, and a device access layer 222. VMFS driver 216 manages creation, use, and deletion of files, such as virtual disks for VMs 203, stored in data storage system 125. Permitted guest operating system command and data transfer operations against the virtual disks are translated to block-level operations on files by VMFS driver 216. Logical volume manager 218 issues raw SCSI operations to device access layer 222 based on the block-level operations issued by VMFS driver 216. Device access layer 222 discovers data storage system 125, and applies command queuing and scheduling policies to the raw SCSI operations.

Although the inventive concepts disclosed herein have been described with reference to specific implementations, many other variations are possible. For example, the inventive techniques and systems described herein may be used in both a hosted and a non-hosted virtualized computer system, regardless of the degree of virtualization, and in which the virtual machine(s) have any number of physical and/or logical virtualized processors. In addition, the invention may also be implemented directly in a computer's primary operating system, both where the operating system is designed to support virtual machines and where it is not. Moreover, the invention may even be implemented wholly or partially in hardware, for example in processor architectures intended to provide hardware support for virtual machines. Further, the inventive system may be implemented with the substitution of different data structures and data types, and resource reservation technologies other than the SCSI protocol. Also, numerous programming techniques utilizing various data structures and memory configurations may be utilized to achieve the results of the inventive system described herein. For example, the tables, record structures and objects may all be implemented in different configurations, redundant, distributed, etc., while still achieving the same results.

Figure 3:
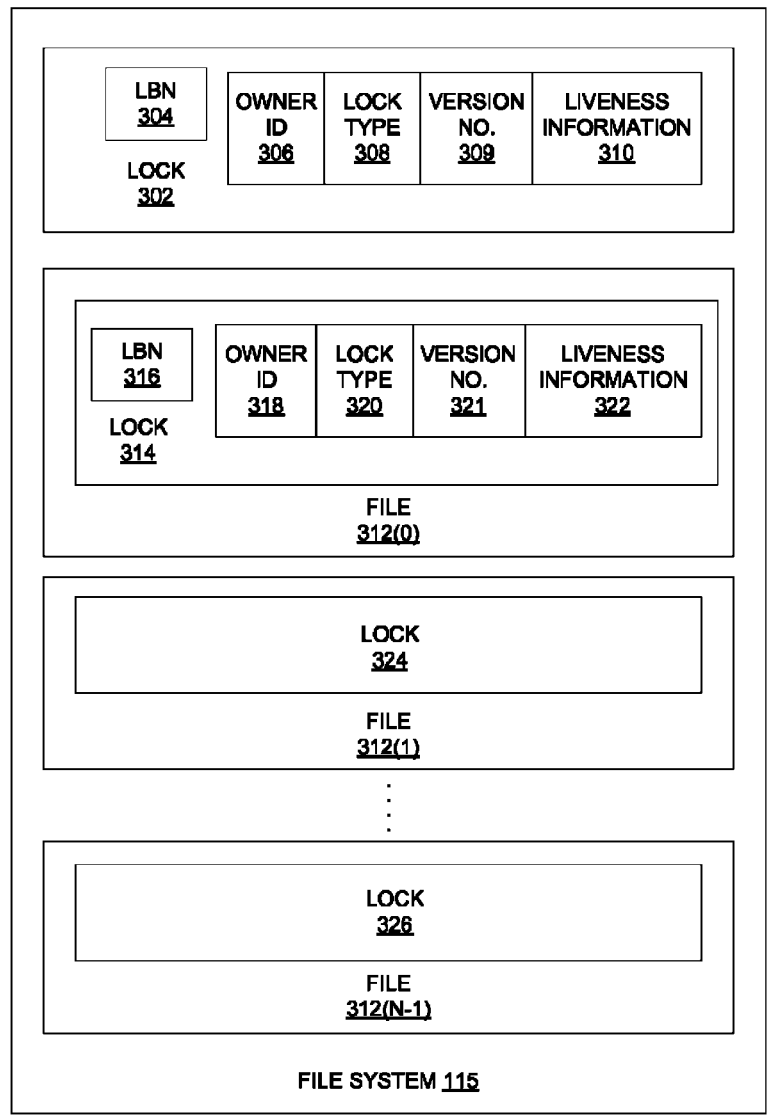
FIG. 3 illustrates data fields of a lock used in one or more embodiments of the present invention.

FIG. 3 illustrates data fields of a lock used in one or more embodiments of the present invention. As illustrated, a lock 302 for file system 115 has data fields for a logical block number (LBN) 304, an owner identification (ID) 306, a lock type 308, version number 309, and liveness information 310, and a lock 314 for file 312(0) has data fields for LBN 316, an owner ID 318, a lock type 320, version number 321, and liveness information 322. FIG. 3 further illustrates that file 312(1) is associated with lock 324, and file 312(N−1) with lock 326. Other resources that have locks include a directory of files. The uses of LBN and version numbers are further described below in conjunction FIGS. 6, 7A, and 7B. Owner ID 306 may be a unit of data, such as a byte, a word, etc., that is used to identify the host that owns or possesses lock 302. The data field for lock type 308 indicates the type of lock and may be implemented with any enumeration data type that is capable of assuming multiple states. Lock types may include any of the following: Null, Concurrent Read, Concurrent Write, Protected Read, Protected Write, or Exclusive. Liveness information 310 provides an indication as to whether the host that currently possesses the lock is still "alive" and has not crashed since acquiring the lock.

In shared file system 115, a shared file may be opened for simultaneous read/write access by multiple hosts and any of the hosts may require metadata modification operations as part of a write. However, as noted above, when the shared file is opened for read/write access by the multiple hosts, the metadata describing the shared file is read into the local memory of each host and kept cached in memory until the shared file is closed by that host. As a result, if a host performs metadata modification operations on a shared file (referred to herein as the "modifier host"), the other hosts (referred to herein as the "observer hosts") need to update their metadata caches or invalidate their cached metadata. Examples of metadata modification operations include file length extensions, file hole plugging, and lazy zeroing.

Figure 4:
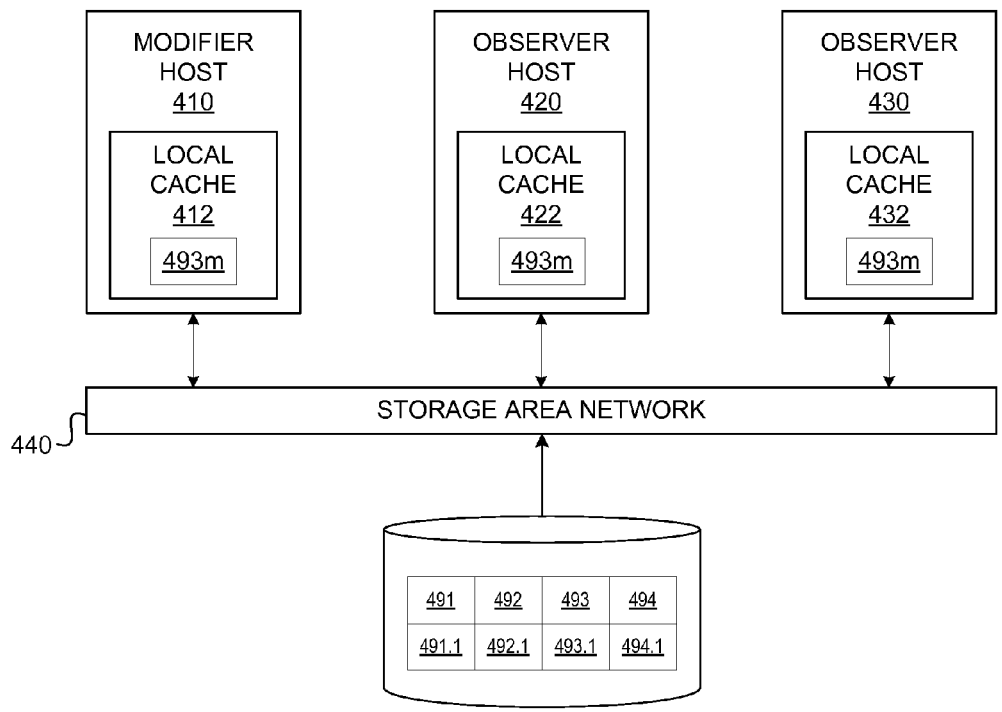
FIG. 4 illustrates a SAN-based clustered file system.

FIG. 4 is a system diagram of a SAN-based clustered file system. There are several server nodes, including modifier host 410 and a plurality of observer hosts 420 and 430. Each of the server nodes has a local cache 412, 422, and 432. The server nodes are connected to a storage area network (SAN) 440, which is also connected to a disk comprising a plurality of shared files 491, 492, 493, and 494. Each of the hosts sharing a given file keeps a copy of the file's metadata in its local cache. Some file systems also keep a copy of any modified dirty data blocks associated with the file (VMFS doesn't). So the cache coherence protocol also applies to data traffic for such file systems. Most such file systems use the more common network-based cache coherence protocol since their locking is also over the network Associated with each file is the corresponding lock information 491.1, 492.1, 493.1, and 494.1.

In the example of FIG. 4, the server nodes are concurrently accessing file 493 for read/write and so each of their local caches have a copy of metadata 493m for file 493. Therefore, if one of the server nodes, e.g., modifier host 410, wishes to modify the metadata of file 493, the other server nodes, e.g., observer hosts 420 and 430, need to be notified of the proposed modification and, after the modification is completed, observer hosts 420 and 430 need to either update or invalidate their local caches 422 and 432 to ensure metadata cache coherence.

Figure 5:
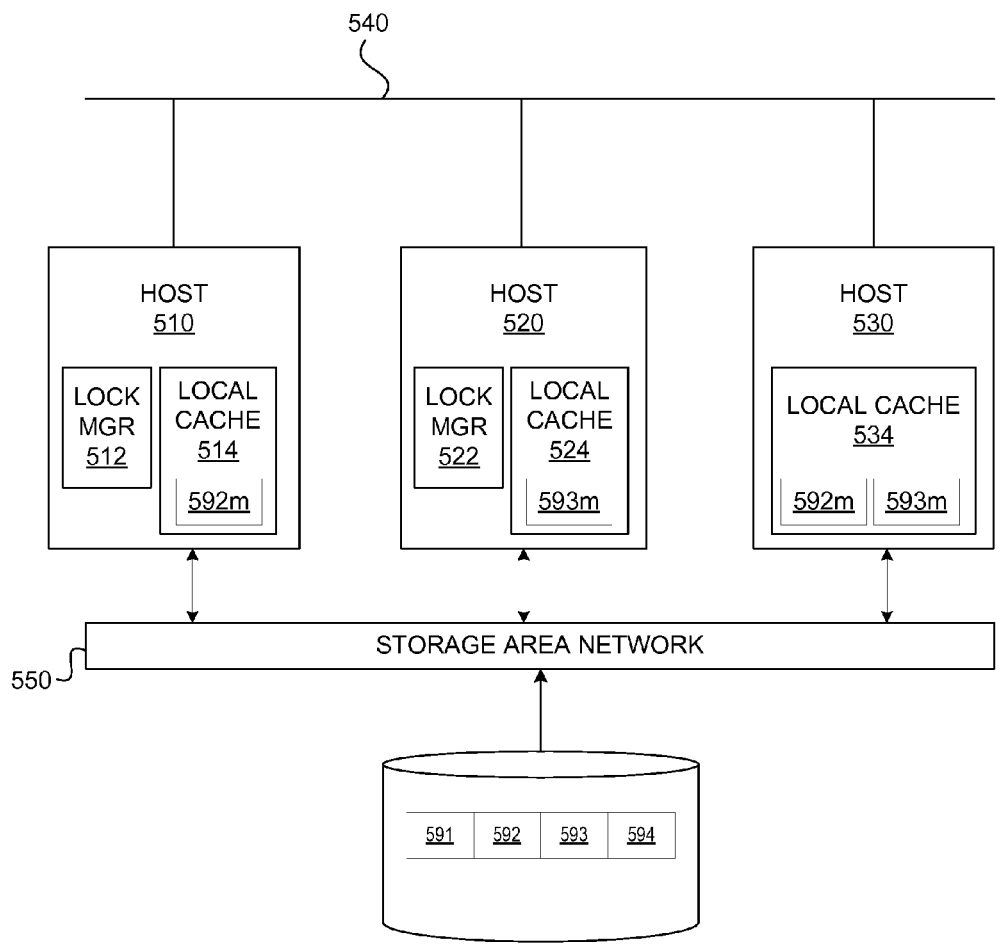
FIG. 5 illustrates a SAN-based clustered file system employing a LAN-based lock manager.

In FIG. 5, the server nodes are connected to one another via a LAN 540 and to shared files 591, 592, 593 and 594 via a SAN 550. LAN 540 is used for lock and cache coherence traffic and SAN 550 is used for data traffic. When a shared file is opened by multiple hosts for simultaneous read/write access and one of the hosts requires metadata modification operations, a coordinating host for ensuring the metadata cache coherence is designated. According to one or more embodiments of the present invention, it is possible for the coordinating host to be different for different shared files. In the example illustrated in FIG. 5, host 510 is designated as the coordinating host for shared file 593 that is shared between host 520 and host 530, and host 520 is designated as the coordinating host for shared file 592 that is shared between host 510 and host 530. The coordinating host may be selected in any technically feasible manner, including via a leader election protocol that relies on quorums/majorities, and the method disclosed in U.S. patent application Ser. No. 13/037,808, filed Mar. 1, 2011, and entitled "Configuration-Less Network Locking Infrastructure for Shared File Systems."

The coordinating host of a shared file includes a lock manager for that shared file, which generally grants requesting hosts access to the shared file (as opposed to having the hosts obtain locks by directly interacting with the SAN). While the lock manager may grant simultaneous locks or access to the shared file for multiple hosts, it ensures that, at any time, at most one host has an actual write lock on that shared file. Host 510 has a lock manager 512 for shared file 593 that has associated metadata 593m, and host 520 has a lock manager 522 for shared file 592 that has associated metadata 592m. To initiate metadata changes for a file, the modifier host, which may be any host having already requested the lock manager for access to the shared file, sends a message to the lock manager, requesting permission to lock the shared file in order to make metadata changes. In response, the lock manager verifies that no other host has a write lock on the shared file and notifies all other hosts having access to the shared file, i.e., observer hosts, of the modifier host's lock request. As a result of receiving this notification, each observer host (1) quiesces all outstanding I/O operations against the file; (2) prevents all subsequent I/O operations against the file; (3) invalidates the metadata for the specified file in its local cache; and (4) notifies the lock manager that it has completed performing these steps. When the lock manager receives notification of completion from all of the observer hosts, it then assigns the lock to the modifier host and notifies the modifier host that it has permission to make metadata changes to the file. After this, the modifier host modifies the metadata associated with the file and notifies the lock manager that it has completed the metadata changes. The lock manager then notifies each of the observer hosts that the metadata changes to the file are complete. In response, the observer hosts update their local caches with the changed metadata and reissue all pending I/O operations to the file. The lock manager releases the modifier host's lock on the file, allowing any host to obtain a write lock on the same file and make its own metadata changes. It should be recognized that alternative embodiments may utilize a lock manager for managing write access for the metadata of a shared file only rather than for the shared file itself. In such embodiments, hosts may directly access the SAN when requesting initial access to a shared file and only request write access from the lock manager when needing to modify the metadata.

Figure 6:
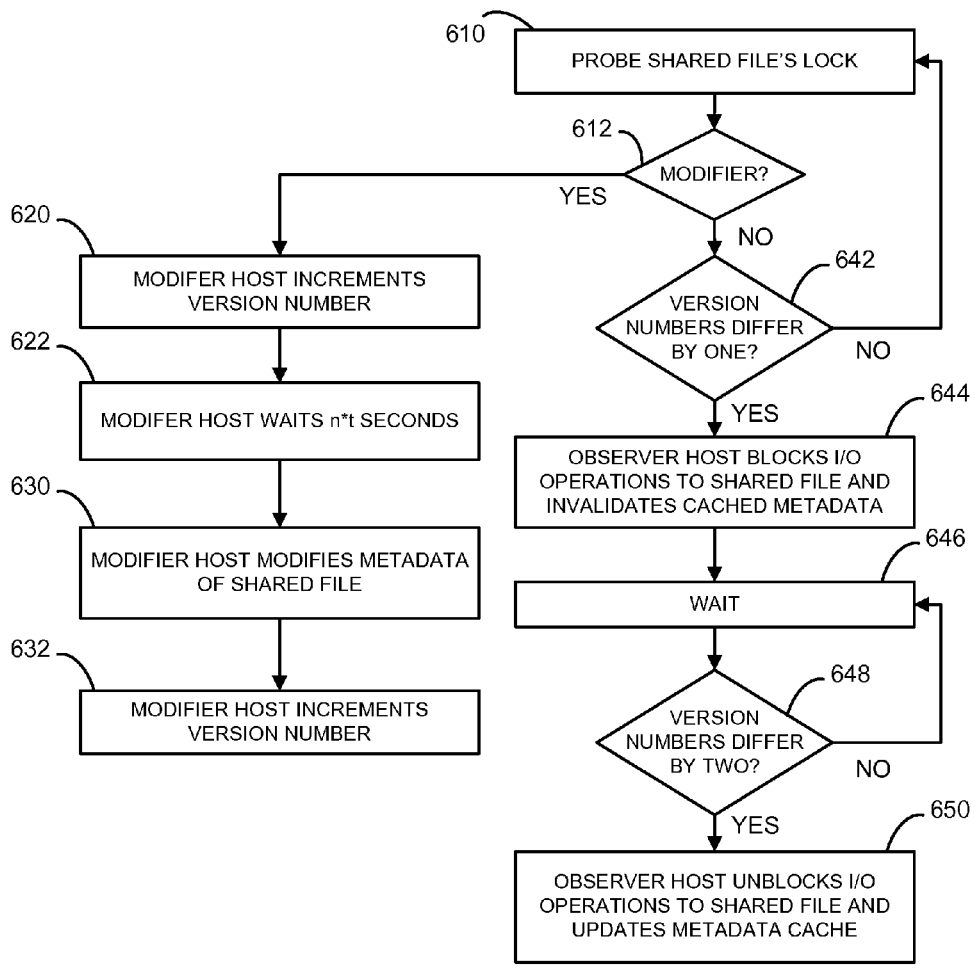
FIG. 6 is a flow diagram of a SAN-based cache coherence protocol involving version number control.

FIG. 6 is a flow chart of a method of ensuring cache coherence in a SAN-based clustered file system, such as that illustrated in FIG. 4 (where, for example, there are no LAN-based lock managers as in FIG. 5). In step 610, each host having simultaneous access to a file (e.g., possessing a type of concurrent access lock to the file, etc.) periodically probes the file's lock to determine whether any of the hosts is currently modifying the metadata associated with that file. In one embodiment, each host is concurrently carrying out its own probing step on a periodic basis at a periodicity of t seconds and determining whether or not the version number of the file's lock has changed. If, for example, one of the hosts desires to modify its locally cached metadata relating to the file, the change in the version number may be determined by such a host using a compare-and-write (CAW) command, which is a Small Computer System Interface (SCSI) command used to atomically check that data in a particular storage location matches a first host-specified data value, and if it does, write a second host-specified data value to that storage location as a single non-interruptible operation. If the version number has not changed, such a host can then become a modifier host by incrementing it (steps 612 and 620). Then, before modifying the metadata of the file, in step 622, the modifier host waits n*t seconds to make sure that its plan to modify the metadata of the file is observed by all of the observer hosts, where as described above, t is the periodicity of the probing process carried out by the other hosts to determine whether or not the version number has changed. Preferably, n is small enough so as not to unduly stall the writing process, yet large enough to allow all of the observer hosts to notice that the version number has changed. After waiting n*t seconds, in step 630, the modifier host performs the metadata modification operation. After completing the metadata changes which are made to the modifier host's cached version and then flushed to disk, in step 632, the modifier host again increments the version number of the file.

When a host, which is not a modifier host, notices in step 642 that the version number of the file's lock has changed, the host recognizes that another host is planning to modify the metadata of the file and thus becomes an observer host. However, if any host is unable to reach the file's lock to determine its version number within n*t seconds, the host purges its cache proactively. The observer host then, in step 644, blocks I/O operations to that file, which includes quiescing all outstanding I/O operations against the file and preventing all subsequent I/O operations against the file, and also invalidates the metadata for the specified file in its local cache. In steps 646 and 648, the observer host periodically checks to see if the version number has been incremented again, using a compare command or the CAW command in other embodiments (where parameters of the CAW command do not actually change the value of the version number, because the same version number is overwritten) described above. Upon determining that the version number has been incremented again, the observer host, in step 650, reads in the modified metadata, as needed, and permits all I/O operations against the file to be issued.

In an alternative embodiment, the probing to determine whether any of the hosts is currently modifying the metadata associated with that file may be carried out by determining whether or not a host has a write lock on the file. This could be done, for example, by storing the value NULL, FALSE or 0 in the storage location of the lock when no host has the write lock.

Figure 7A:
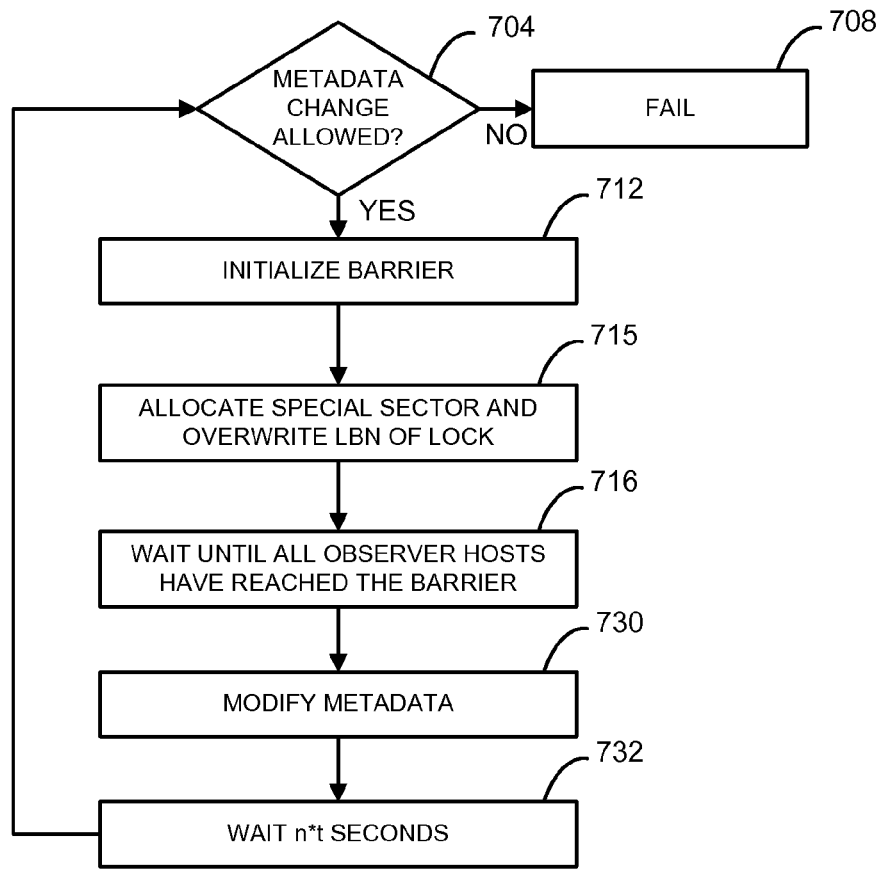
FIGS. 7A and 7B are flow diagrams of a SAN-based cache coherence protocol involving a barrier implemented on-disk.
Figure 7B:
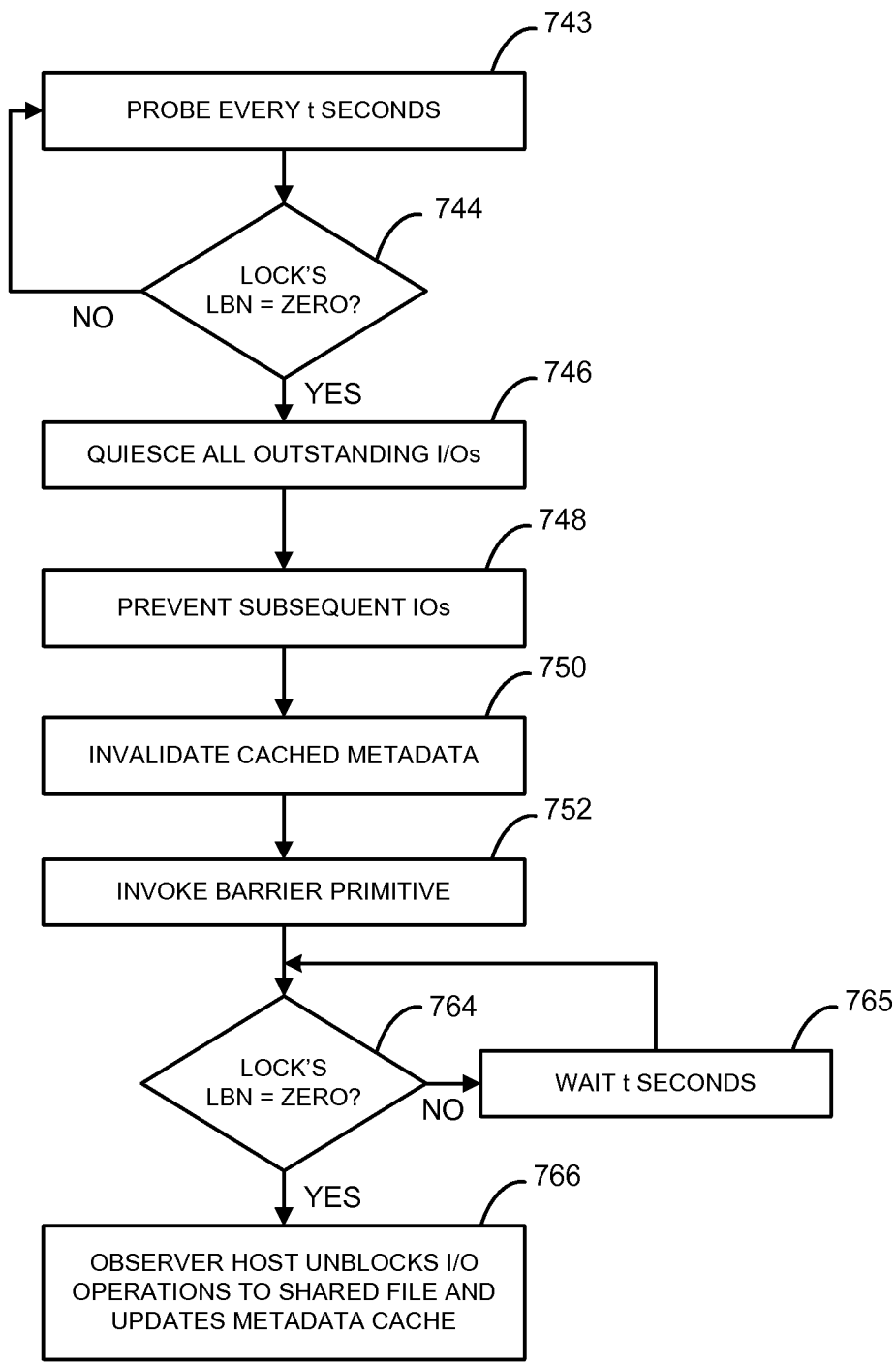

FIGS. 7A and 7B illustrate a process for ensuring SAN-based cache coherence. FIG. 7A is a flow diagram of the process from the perspective of the modifier host, which is making changes to the metadata of a shared file, and FIG. 7B is a flow diagram of the process from the perspective of one or more observer hosts, each of which has access to the shared file and has a copy of the file's metadata in its local cache. In the embodiments of FIGS. 7A and 7B, as further described below, the set of code instructions to ensure cache coherence that is executed by each of the hosts having shared access to a file (e.g., whether a modifier host or an observer host) includes a "barrier" primitive that causes each such host to wait at the barrier (e.g., execute a tight loop) until a certain "barrier count" that is globally readable and accessible by each such host reaches zero, indicating that every host has completed executing the code up to its barrier primitive In step 704, the modifier host determines whether metadata modifications to the shared file are allowed. In one embodiment, in step 704, similar to the above embodiment of FIG. 6, the modifier host utilizes a CAW command to set the lock version number of a shared files lock to indicate that it has successfully acquired the right to modify the metadata. If metadata modifications are not allowed (e.g., the modifier host has not successfully incremented the version number of the file's lock in one embodiment), the metadata modification attempt fails in step 708. However, if metadata modifications are allowed, the modifier host then initializes a "barrier" in step 712 by storing on disk a "barrier count" that is equal to the number of hosts that have opened the shared file for concurrent access and thus have the file's metadata in their local caches. In step 715, the modifier host requests allocation of a special sector from file system 115 and overwrites the lock's LBN with the LBN of the special sector. In one embodiment, the barrier count may be stored in the special sector. In step 716, the code executed by the modifier host reaches the barrier primitive, causing the barrier count to be decremented and causing the modifier host to wait at the barrier until the barrier count reaches zero. As further described below in the context of FIG. 7B, observer hosts will be concurrently executing a corresponding set of code instructions that will also ultimately include a barrier primitive that will cause the observer hosts to decrement the barrier count and wait at the barrier. As such, the barrier count will ultimately reach zero indicating that all hosts with concurrent access to the shared file have reached the barrier primitive in their execution and thus know about the proposed metadata change, as further detailed below. After it is confirmed in step 716 that all hosts have reached the barrier, the modifier host performs the metadata change in step 730, updating its local cache and flushing it to disk. After the metadata change is done, in step 732, the modifier host writes the value of zero into the lock's LBN to inform all of the observer hosts that the metadata change operation has completed. After n*t seconds, the modifier host is free to make further metadata modifications by returning to step 704, where t is the periodicity of the probe process defined above, and n is a fixed predetermined constant. Preferably, n is small enough so as not to unduly stall the metadata modification process, yet large enough to allow all of the observer hosts to recognize that the metadata modification process has completed and to update their local caches.

As depicted in FIG. 7B, hosts other than a modifier host carry out the probe process (step 743) with a periodicity of t seconds becoming observer hosts when they recognize in step 744 that another host is proposing changes to the metadata of the shared file, e.g., when the lock's LBN is no longer zero. Upon recognizing that another host is proposing changes to the metadata of the shared file, each observer host carries out the following steps: (1) quiescing all outstanding I/O operations against the file (step 746); (2) preventing all subsequent I/O operations against the file (step 748); and (3) invalidating the metadata for the specified file in its local cache (step 750). After step 750, each observer host will reach a barrier primitive in its execution flow causing it to decrement the barrier count and wait at the barrier until the barrier count reaches zero (step 752). Step 764 is executed after all hosts having concurrent access to the shared file have reached the barrier (i.e., the barrier count reaches zero). In step 764, the observer host determines whether the metadata modification operation is still ongoing, e.g., whether the lock's LBN is still non-zero. If so, then the observer host waits in step 765 for another t seconds before checking again. If not, then the observer host, in step 766, reads in the modified metadata, as needed, and permits all I/O operations against the file to be issued.

Figure 8:
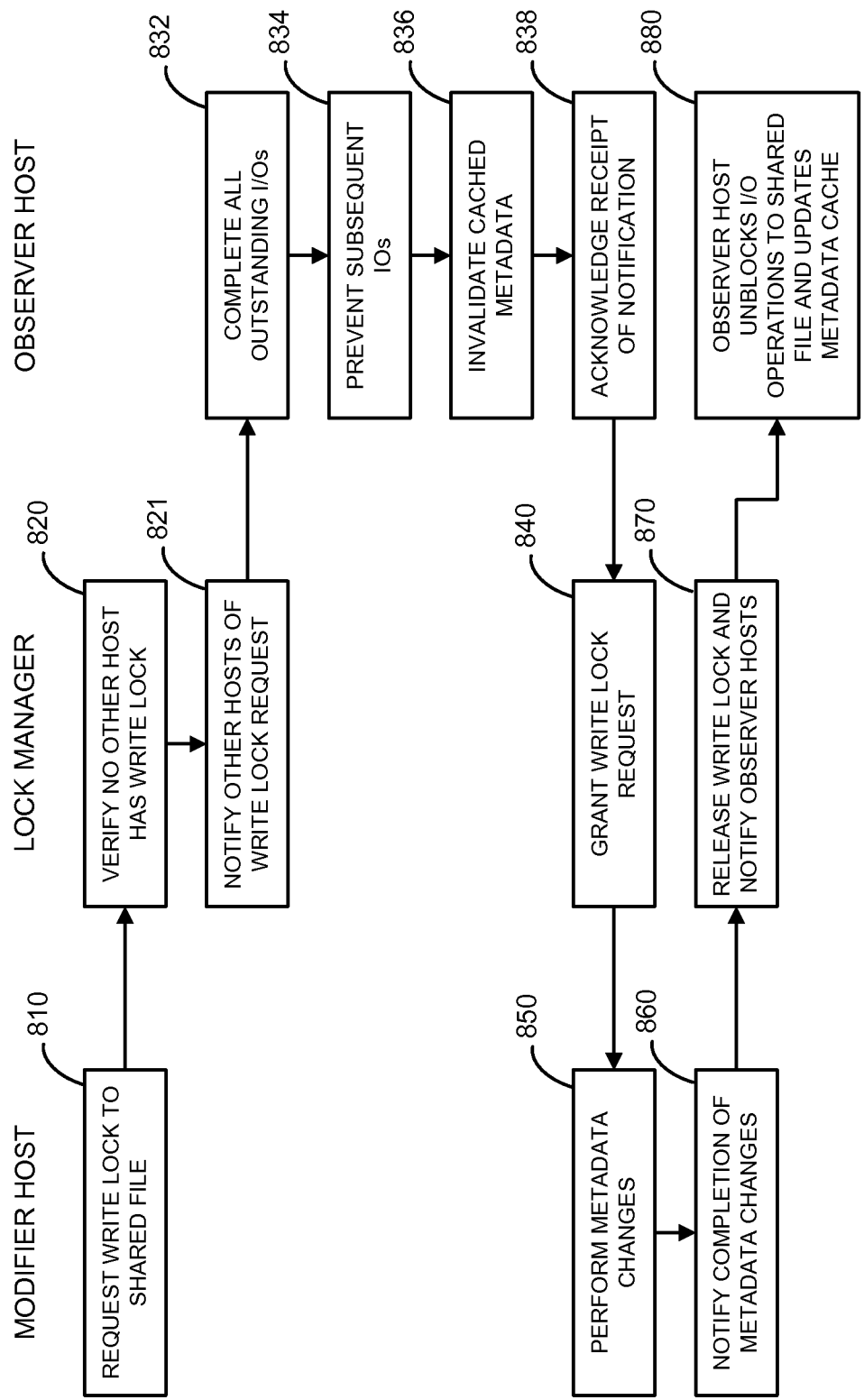
FIG. 8 is a flow diagram of a cache coherence protocol that relies on a LAN-based lock manager.

FIG. 8 illustrates a flow chart of a method of ensuring cache coherence in a SAN-based clustered file system that employs a LAN-based lock manager, such as that illustrated in FIG. 5. In step 810, the modifier host, e.g., host 520, sends a request to the lock manager running in a coordinating host, e.g., host 510, requesting a write lock on a shared file (i.e., the lock manager has previously granted concurrent access to the shared file to a number of hosts), such as file 593, so that it can modify the metadata of the shared file. This request is transmitted over LAN 540. In step 820, the lock manager verifies that no other host having concurrent access to the file has a write lock on the file of interest and, in step 821, notifies all other hosts of the modifier host's lock request. Then, each of the other hosts, i.e., observer hosts (e.g., host 530), carries out the following steps: finish all outstanding I/O operations on the file of interest (step 832); prevent all subsequent I/O operations on the file of interest (step 834); invalidate the metadata of the file of interest in its local cache (step 836); and acknowledge the receipt of notification of the modifier host's lock request to the lock manager (step 838) over LAN 540. In step 840, the lock manager notifies the modifier host that it has permission to modify the metadata associated with the file of interest and assigns the write lock to the modifier host. The lock assignment is stored by the lock manager. In one embodiment, the lock manager writes out the assignment to the lock data structure on disk so that lock ownership can be deduced by a new lock manager in case the host in which the lock manager is running fails while the modifier host has a valid lock assignment. In step 850, the modifier host modifies the metadata of the file in its local cache and flushes the modifications to disk. In step 860, the modifier host notifies the lock manager that it has completed the metadata changes to the file. In step 870, the lock manager releases the write lock and notifies the observer hosts of the release (e.g., via LAN 540). In step 880, the observer hosts read in the modified metadata, as needed, and permit all I/O operations against the file to be issued.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments, may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method of ensuring metadata cache coherence of a shared file that is simultaneously accessed by multiple hosts including a first host and one or more other hosts, the first host modifying a metadata of the shared file, the shared file being associated with a lock having a data field for storing a version number, comprising the steps of:
   comparing, by the first host, the version number stored in the data field of the lock with a version number that is locally cached within the first host;

if the version numbers match, incrementing the version number and storing the incremented version number in the data field of the lock; and after said storing, modifying the metadata of the shared file, incrementing the version number once more in response to said modifying, and storing the incremented version number in the data field of the lock.

2. The method of claim 1, wherein after said storing, waiting for a predetermined amount of time before modifying the metadata of the shared file.

3. The method of claim 2, wherein each of the other hosts is configured to carry out the step of comparing once per a time period, and the predetermined amount of time equals n multiplied by a length of the time period, where n is an integer greater than 1.

4. The method of claim 2, wherein each of the other hosts is configured to block I/O operations to the shared file upon detecting that the version number stored in the data field of the lock does not match a locally cached version number.

5. The method of claim 2, wherein each of the other hosts is configured to unblock I/O operations to the shared file upon detecting that the version number stored in the data field of the lock is two greater than a locally cached version number.

6. The method of claim 5, wherein each of the other hosts is further configured to update the metadata of the shared file cached therein upon detecting that the version number stored in the data field of the lock is two greater than a locally cached version number.

7. The method of claim 1, wherein said comparing is performed using a compare-and-write command.

8. A method of ensuring metadata cache coherence of a shared file that is simultaneously accessed by multiple hosts, comprising the steps of:

storing a first value in a predetermined storage location to indicate that the metadata of the shared file is being modified;

determining from a counter value whether or not all other hosts that are accessing the shared file recognize that the metadata of the shared file is being modified, wherein the counter value is initialized to be equal to the number of hosts that are simultaneously accessing the shared file, and the counter value is decremented each time one of the hosts recognizes that the metadata of the shared file is being modified; and upon determining that all other hosts that are accessing the shared file recognize that the metadata of the shared file is being modified, modifying the metadata of the shared file and storing a second value in the predetermined storage location to indicate that the metadata of the shared file is no longer being modified.

9. The method of claim 8, wherein the predetermined storage location is a logical block number associated with a lock of the shared file.

10. The method of claim 8, wherein each of the hosts, other than a host that is carrying out the metadata modification, is configured to carry out the step of determining once per a first time period, whether or not a value stored in the predetermined storage location is equal to the second value.

11. The method of claim 10, wherein each of the hosts, other than a host that is carrying out the metadata modification, is configured to block I/O operations to the shared file upon detecting that the value stored in the predetermined storage location is not equal to the second value.

12. The method of claim 10, wherein each of the hosts, other than a host that is carrying out the metadata modification, is configured to block I/O operations to decrement the counter value upon detecting that the value stored in the predetermined storage location is not equal to the second value.

13. The method of claim 10, wherein after a second time period equal to n multiplied by the first time period has elapsed after said modifying, where n is an integer greater than 1, determining if an additional metadata modification to the shared file is permitted.

14. The method of claim 8, wherein each of the hosts, other than a host that is carrying out the metadata modification, is configured to unblock I/O operations to the shared file upon detecting that the value stored in the predetermined storage location is equal to the second value.

15. The method of claim 14, wherein each of the hosts, other than a host that is carrying out the metadata modification, is further configured to update the metadata of the shared file cached therein upon detecting that the value stored in the predetermined storage location is equal to the second value.

16. A method of ensuring metadata cache coherence of shared files, each of which is simultaneously accessed by multiple hosts, comprising the steps of:

designating a first one of the multiple hosts as a lock manager for a first shared file; and designating a second one of the multiple hosts as a lock manager for a second shared file, wherein the lock manager for a shared file grants a write lock to a modifier host to permit the modifier host to change metadata of the shared file and notifies other hosts that are accessing the shared file of the write lock grant.

17. The method of claim 16, wherein each of the other hosts is configured to block I/O operations to the shared file upon receiving notification of the write lock grant to the modifier host.

18. The method of claim 17, wherein the lock manager for the shared file notifies the other hosts that are accessing the shared file that the metadata changes have been completed.

19. The method of claim 18, wherein each of the other hosts is configured to unblock I/O operations to the shared file and update the metadata of the shared data cached therein upon receiving notification that the metadata changes have been completed.

* * * * *